United States Patent [15] 3,689,700
Lent [45] Sept. 5, 1972

[54] SUBSCRIBER LOOP EXTENSION UNIT

[72] Inventor: Worthington C. Lent, Whittier, Calif.

[73] Assignee: Lear Siegler, Inc., Santa Monica, Calif.

[22] Filed: Sept. 21, 1970

[21] Appl. No.: 73,745

[52] U.S. Cl. ....................179/16 F, 179/84 R
[51] Int. Cl. ..........H04q 1/36, H04b 3/36, H04b 3/40
[58] Field of Search .....179/16 E, 16 F, 18 HB, 84 R, 179/84 UF, 16 EA

[56] References Cited

UNITED STATES PATENTS

| | | | |
|---|---|---|---|
| 3,247,327 | 4/1966 | Lanham | 179/84 R |
| 1,719,499 | 7/1929 | Bowne | 179/16 E |
| 3,465,104 | 9/1969 | Zebe | 179/16 F |
| 3,339,027 | 8/1967 | Feiner et al. | 179/16 F |
| 3,291,916 | 12/1966 | Jorgensen | 179/18 HB |
| 3,626,201 | 12/1971 | Chambers, Jr. | 179/16 F |
| 3,626,101 | 12/1971 | Fitzsimons et al. | 179/16 F |
| 3,591,728 | 7/1971 | Birck | 179/84 R |
| 3,166,642 | 1/1965 | Abbott | 179/16 E |

*Primary Examiner*—Kathleen H. Claffy
*Assistant Examiner*—Randall P. Myers
*Attorney*—Christie, Parker & Hale

[57] ABSTRACT

A loop extension unit for transmission circuits for increasing the central switching office to subscriber station range. The unit provides dial pulse repeating, transmission of ringing signals from whatever source provided and other supervisory signalling. Interruption of ringing is controlled by the unit by detection of an off-hook condition at the subscriber location with the ringing circuit locked out during completion of the subscriber loop between the central office and the station. DC isolation of the unit is provided by utilizing a periodically varying signal generator and transformer coupling as part of the pulse repeating circuitry.

21 Claims, 4 Drawing Figures

PATENTED SEP 5 1972

3,689,700

SHEET 1 OF 3

INVENTOR
WORTHINGTON C. LENT

Christie, Parker & Hale
ATTORNEYS

SUBSCRIBER LOOP EXTENSION UNIT

DESCRIPTION OF THE PRIOR ART

The present invention relates to two wire transmission systems and, in particular, to loop extension units for extending the signalling and supervisory range of a voice frequency dial telephone circuit.

In the operation of two wire transmission circuits, such as those used in a conventional telephone exchange, a maximum tolerable limit in terms of total circuit resistance (generally proportional to total physical distance) between the subscriber's equipment and the central office is frequently encountered. Various solutions to increasing this maximum limit, i.e., the range of the circuit, have been provided including the provision of one or more booster units at intermediate points between the central office and the subscriber equipment. Such booster units provide supervision and signalling on the subscriber loop and may also be required to amplify voice signals. One specific embodiment of such a unit is relay equipped. By means of one or more pulsing relays and a suitable power source connection, dial pulse and ringing signal transmission between the central office and subscriber equipment is accomplished. As with most conventional relay equipment utilized in telephone exchange plants, such equipment is subject to deterioration of adjustment resulting ultimately in a loss of supervision on the loop. To counteract or to prevent such problems, routine maintenance is performed on all relay equipment in the exchange plant, including such booster or loop extension units, so as to bring the per cent break and other performance requirements of the relay equipment back to optimum levels. Obviously such maintenance involves the use of labor and the expense attendant therein.

In the design of such booster units, usually referred to as subscriber loop extension units, it is normally required to provide DC isolation between the unit and the central office. This is due to such units acting as a second DC source and, therefore, must be prevented from feeding a DC signal back to the central office to counteract the DC signal supplied from the central office battery. The relay equipments provided in conventional subscriber loop extension units are also a typical solution to the isolation problem.

SUMMARY OF THE INVENTION

The present invention provides a new and improved subscriber loop extension unit, also referred to herein as a dial long line unit, suitable for use on two wire telephone subscriber loops utilizing loop pulsing and metallic, battery, or ground connected ringing sources.

The unit according to the present invention provides for an approximate four-fold increase in normal maximum loop resistance and in addition employs solely solid state circuitry in the pulsing portion of the unit. The invention also serves as an isolating device for use in a two wire transmission system having at least one signalling path and an independent alternating current path over a portion of its length. The isolating device comprises means for generating a periodically varying signal, means for controlling the operation of the signal generating means and periodically varying signal coupling means which connect an output from the signal generating means into the signalling path and provides unidirectional signal isolation along the signalling path.

The invention also provides a unit for extending the range of an exchange telephone circuit comprising a voice frequency transmission circuit interconnecting a telephone central office and station equipment at a subscriber location and a dial pulse repeater connected in parallel circuit relationship with the voice frequency transmission circuit. First relay means for controlling both the transmission of ringing signals to the station equipment and the continuity of said voice frequency transmission circuit are also provided as well as second relay means for controlling said first relay means with said second relay means being responsive to connection of the station equipment to the telephone circuit.

In another aspect the invention provides a unit for extending the range of a two wire transmission circuit comprising an alternating signal transmission circuit interconnecting a switching location and station equipment located remotely with respect to the switching location. Switching means are connected in series circuit relationship between the alternating signal transmission circuit and the station equipment and a source of signals is connected to the switching means. Control means for selectively connecting the transmission circuit or the signalling source to the station equipment is provided. Means for transmitting pulsing signals from the station equipment to the central switching location are connected in parallel circuit relationship with the transmission circuit and a source of electrical power is connected to the pulsing signal transmitting means and the switching means.

The unit provides the required DC isolation from the central office by virtue of its utilization, in one embodiment, of a multivibrator as the means for generating a periodically varying signal and a transformer as an alternating signal coupling means connected between the multivibrator and the central office loop. Control means are provided in the unit for turning the multivibrator on and off. Dial pulses originating in the subscriber equipment are repeated by circuitry utilizing entirely solid state components thereby eliminating laborious and frequent pulsing relay adjustments. Flexibility is incorporated into the unit by means of strapping options which render it usable with either central office or local ringing signal sources and a ring-trip feature is included to open and lock out the ringing circuit upon completion of the subscriber loop.

Voice frequency currents are extended via a 1:1 balanced transformer which exhibits a nominal transmission loss for all normal loop currents encountered and the design of the unit is such that loop-pulsing performance is independent of subscriber loop resistance between nominal loop resistance limits. The subscriber loop extension unit according to the present invention can be utilized in tandem with similar units up to three in total. When used in short loops, the unit operates without the need for special strapping options. On extremely long loops, an auxiliary power source or booster unit is connectable to the loop extension unit of the present invention to enable the maintenance of nominal values of loop current in the circuit. In one embodiment such connection is accomplished by means of mating connectors provided on each unit. Power filters are provided in each unit to attenuate noise generated in the units, along the transmission circuit, or at the central office and eliminate audible noise signals in the voice transmission circuit from any of such sources.

DESCRIPTION OF THE DRAWINGS

These and other advantages of the present invention will be better understood by reference to the following figures wherein.

DESCRIPTION OF A SPECIFIC EMBODIMENT

Figures 1, 2:
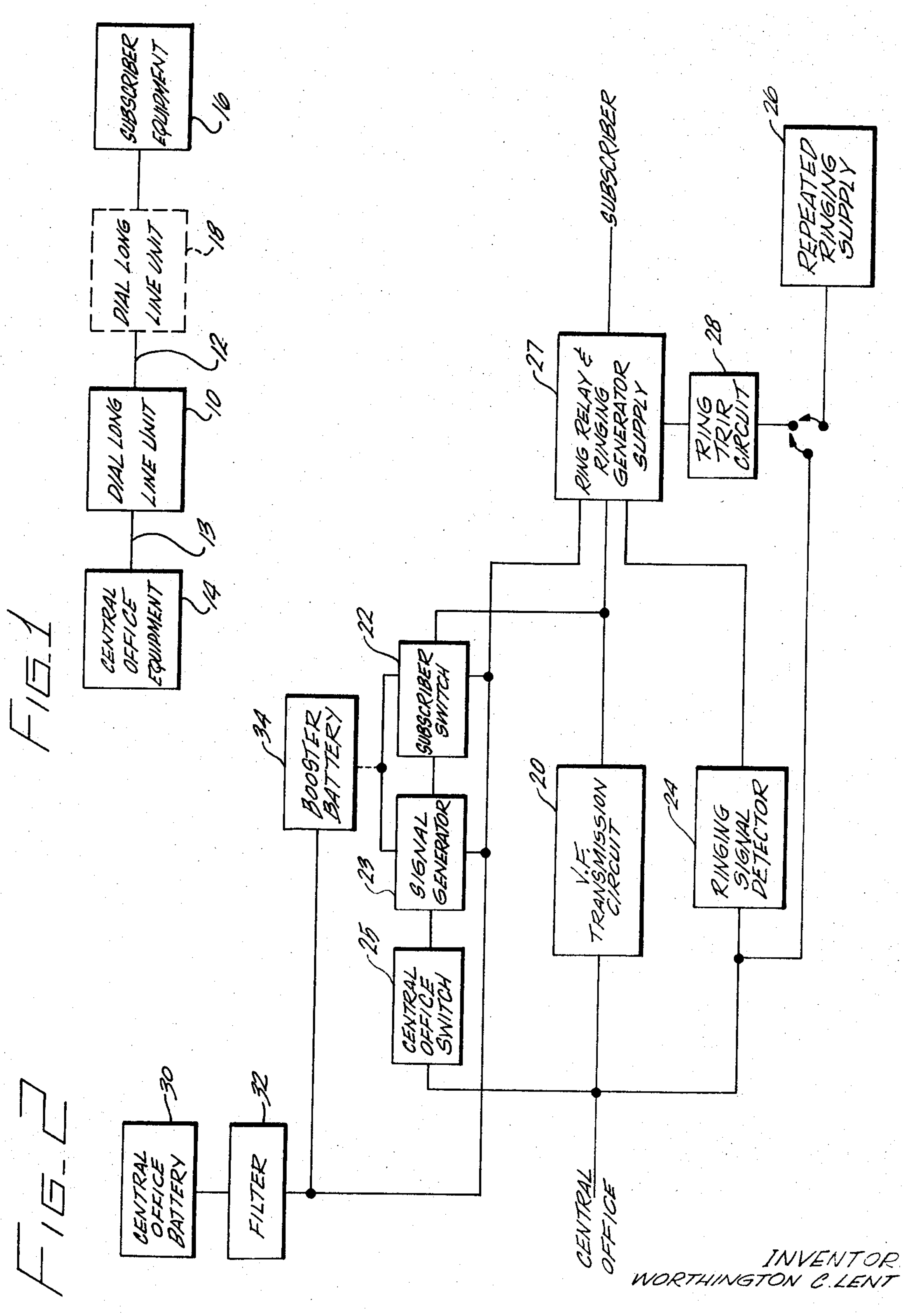
FIG. 1 is a block diagram illustrating use of the subscriber loop extension unit according to the present invention.
FIG. 2 is a block diagram of the loop extension unit.

The utilization of one or more subscriber loop extension units according to the present invention in a typical voice frequency telephone loop is illustrated in FIG. 1. Unit 10 is adapted for insertion in a subscriber loop 12 at a point intermediate telephone central office switching equipment 14 and subscriber station equipment 16 located at a point remote from the central office. A second dial long line unit 18 is shown in ghosted representation intermediate unit 10 and station equipment 16 to illustrate the operation of a plurality of units according to the present invention. For application on extremely long transmission loops, as many as three dial long line units can be employed in a tandem connection with intermediate loop resistance limits on the order of 500 to 3,500 ohms between units. Specific adjustments such as strapping condensors in the presently preferred embodiment are provided on each dial long line unit to render them compatible with central office relay equipment and to compensate for the slower speed of response of such equipment. When used in tandem connections, the additional line reactance of the intermediate portion of the subscriber loop between units is counteracted by strapping out a condensor, at least in the unit 18 closest to the subscriber location.

In terms of physical arrangements, the unit of the present invention is modularized and mounted on a printed circuit card suitable for shelf mounting. In the majority of cases a cluster of units, each connected in a different subscriber loop, are located in the serving central office but may also be located in an intermediate central office (particularly when used in tandem) or in an equipment enclosure located outside the central office. In all cases a maximum loop impedance between the central office and the unit 10 and between the unit and the subscriber location for given minimum values of loop circuit exists. Loops of greater impedance, i.e., greater distance from the central office, will impose a requirement for tandem operation of the units.

The block diagram in FIG. 2 illustrates the circuit functions of a subscriber loop extension or dial long line unit 10 according to the present invention. As shown therein, a voice frequency transmission circuit 20 extends through the unit to provide a talking path between the subscriber location and the central office. Located in parallel circuit relationship with circuit 20 is a series connected combination comprising a subscriber switch 22, a periodically varying signal generator 23, and a central office switch 25 which together act as a dial pulse repeater for receiving pulses from the subscriber location and conditioning said pulsing signals for transmission to the central office and subsequent dial signalling to and beyond that point.

A ringing signal detector 24 is connected in a second parallel circuit relationship with transmission circuit 20 to the central office loop and a ring relay and generator supply 27 and is utilized to detect the presence of ringing signals in the central office loop. Upon detection of the presence of ringing signals, detector 24 opens the voice circuit and closes a ringing signal path through supply 27 by operation of a ring relay in the supply. Ringing signals emanating from the central office or from a local ringing supply or signal source 26 are thereby transmitted through a ring trip circuit 28 through supply 27 to the subscriber location. Upon the closing of the switch hook at the subscriber location when the cell is answered, a battery signal is superimposed on the ringing signal and transmitted to ring trip circuit 28 operating a trip relay. Operation of the ring trip relay in turn operates the ringing relay in supply 27 disconnecting the ringing signal from the subscriber loop and causing the voice path to be restored, thereby connecting an incoming call to the subscriber equipment. Auxiliary contacts on the ring-trip relay also cause a low resistance short circuit to be applied to the central office loop to establish the current necessary to actuate the ringing lock-out relay in the central office.

When a call is originated from the subscriber location, DC dial pulses emanating from the subset are transmitted to switch 22. DC isolation of the central office loop from the subscriber loop through voice frequency transmission circuit 20 is obtained by means of a transformer.

A source of power such as a central office battery 30 is connected to unit 10 through a battery supply filter 32. Filter 32 is a low pass filter to prevent random noise from the central office battery from being transmitted to the subscriber loop and to prevent such noise present in the subscriber loop or unit 10 from being transmitted to the central office. Depending upon minimum current requirements and the total resistance of the loop in the subscriber side of the unit, an auxiliary power source such as a booster battery 34 may also be provided by means of a plug-in connector in the unit. Where the unit 10 is utilized on subscriber loops having a loop resistance on the order of 1500 ohms or less, the connection of booster battery 34 to the unit is normally not necessary.

Figure 3:
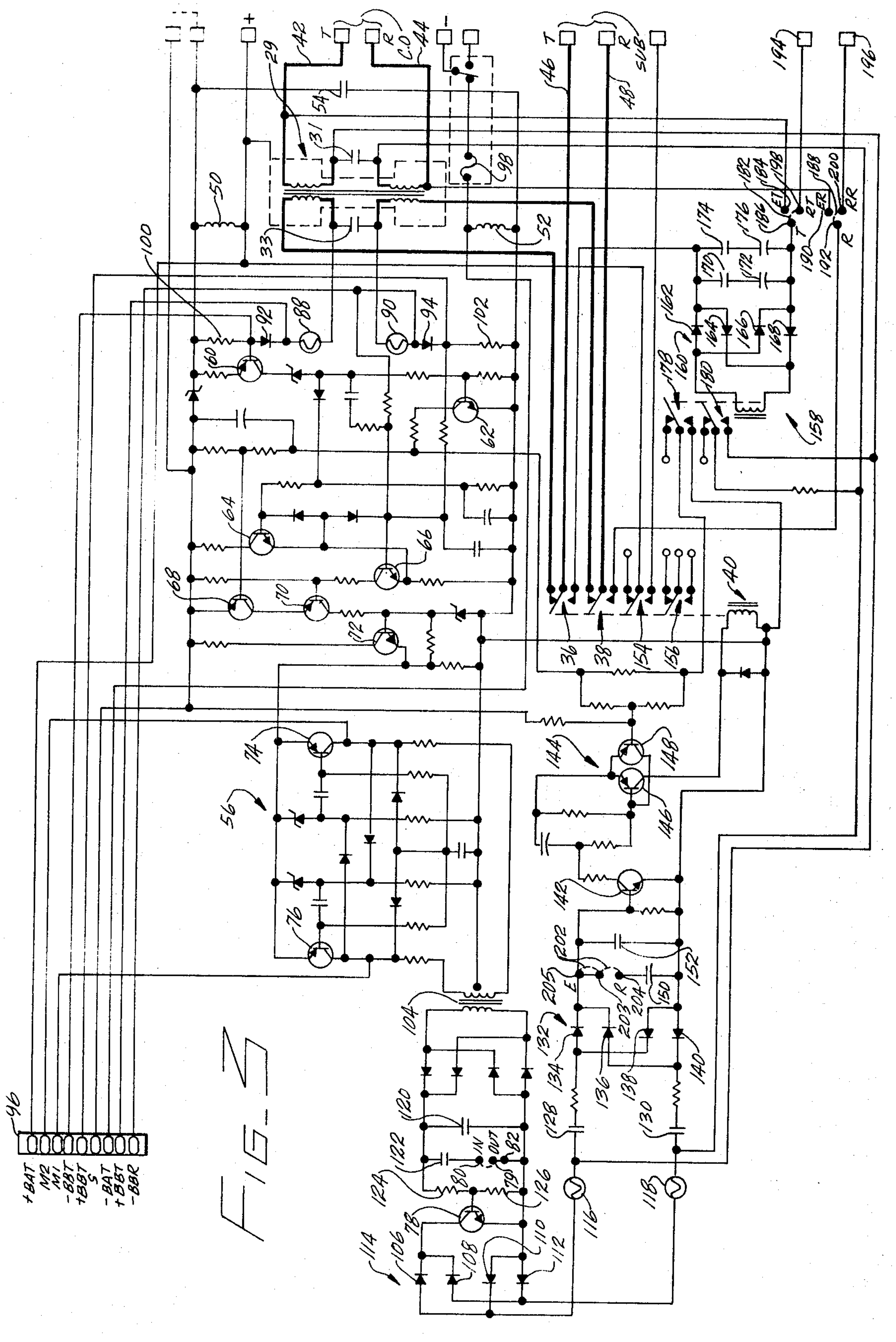
FIG. 3 is a schematic diagram of the subscriber loop extension unit according to the present invention.

Specific circuit details of dial long line unit 10, according to the present invention, are illustrated in FIG. 3. The voice frequency transmission circuit portion includes a balanced 1:1 transformer 29, capacitors 31, 33 and contacts 36, 38 of relay 40. The tip and ring conductors 42, 44, respectively, from the central office connect to one winding of transformer 29 while the tip and ring conductors 46, 48 to the subscriber location extend from contacts 36, 38 of relay 40. Capacitor 31 provides a bypass for voice frequencies on the central office side of transformer 30 while capacitor 33 provides the same function on the subscriber side of the transformer.

Inductors 50, 52 and capacitor 54 combine to provide a battery supply filter, preventing transmission of noise signals to or from the central office. In addition to the use of two separate chokes 50, 52 as shown in FIG. 3, other filter design options are contemplated where space and other circuit considerations permit. Included are the use of a common core choke and two single core double winding chokes which are connected to selectively reject differential or longitudinal noise signals or both depending on the specific circuit requirements.

The subscriber switch portion of the unit is connected in parallel circuit relationship with the voice frequency transmission circuit portion to the subscriber side of transformer 29 through resistance lamps 88, 90. The resistance lamps provide current limiting in the subscriber loop and surge protection for the semiconductors and other components in the pulsing unit making use of the unit over short loops possible without the necessity of special strapping options. Diodes 92, 94 provide the circuit path whereby additional voltage is transmitted to the unit when connector 96 on the dial long line unit is connected to the booster battery unit. When so connected, the output from the booster battery is connected to the subscriber loop in series with the conventional 48 volts provided from the central office supply battery through fuse 98 and resistors 100, 102. Alternatively, diodes 92, 94 may be omitted from the unit and replaced by shorting clips across the junction points where the diodes are connected in the circuit. Such an alternative is utilized in instances when back biasing of the diodes or an imbalance is possible to prevent the generation of noise signals inherent in such conditions.

Transistors 60, 62, 64, 66, 68 and 70 of the subscriber switch portion of the unit comprise a loop current sensing circuit which translate current changes produced by the subscriber's dial into a control voltage for alternately operating and inhibiting a free running multivibrator 56 comprised of transistors 74, 76 and associated components. Transistor 72 is a power amplifier interconnecting the loop current sensing circuit and the free running multivibrator and provides the switching signal controlling operation of the multivibrator. Transistors 68, 70 comprise an ADD circuit providing a logic signal to switch transistor 72 which in turn controls the ON-OFF operation of the multivibrator.

The central office switch portion of unit 10 includes a transformer 104 connected to the output of the free running multivibrator 56 which acts as a means for providing DC isolation between the central office and the dial long line unit 10, as well as serving as a load for coupling the output of the multivibrator to a full wave bridge rectifier 114 comprising diodes 106, 108, 110 and 112. In response to being operated or inhibited by the loop current sensing circuit, the output of the multivibrator is transmitted through transformer 104 to a central office seizing transistor 78 to control the conduction thereof. The ON-OFF operations of transistor 78 are transmitted in the form of pulses through diode bridge 114 and central office resistance lamps 116, 118 to the central office side of transformer 29. Resistance lamps 116, 118 like lamps 88, 90 provide current limiting, in this case in the central office loop, again enabling use of the unit in short loops without special modifications. Responsive to the ON-OFF operations of transistor 78, the appropriate number of dial signalling pulses are thereby transmitted to the central office.

Capacitors 120, 122 in conjunction with resistors 124, 126 combine to provide an integrating circuit which maintains a turn-on bias of transistor 78 for a controlled period of time after the multivibrator has been turned off to permit the completion of the transmission of pulses to the central office. As shown in the schematic of FIG. 3, and as indicated earlier, condensor 122 can be strapped into or out of the integrating circuit at the input to transistor 78 to adjust the percent break for the relay equipment in the central office. As shown in FIG. 3, condensor 122 is out of the circuit. By connecting strap 79 across terminals 80, 82, the condensor is connected into the unit and the percent break is reduced. Diode bridge 114 maintains the correct bias across transistor 78 for either battery polarity that is extended to the unit from the central office. As with resistance lamps 88, 90, central office resistance lamps 116, 118 provide current limiting in the central office loop as well as surge protection for the diode bridge 114 and transistor 78.

The ringing signal detector includes blocking capacitors 128, 130; diode bridge 132 comprising diodes 134, 136, 138, 140; transistor driver 142; bistable relay driver 144, comprising transistors 146, 148; talk-ring relay winding 40 and associated components. Ringing signals of any of the various standard frequencies currently in use transmitted from the central office are rectified by diode bridge 132 with the rectified output from bridge 132 being utilized to charge capacitors 150, 152 to produce a turn-on of transistor driver 142. The turn-on of transistor driver 142 in turn causes transistor 146 to conduct and energizes the winding of relay 40 causing contacts 36, 38, 154, 156 to operate. In the operated condition of said contacts, ringing signals from either a local ringing generator supply connected at terminals 194, 196 or from the central office ringing supply are extended to the subscriber tip and ring sides of the line. The voice frequency transmission path from the central office tip 42 and ring 44 through balanced transformer 29 to the subscriber tip 46 and ring 48 is interrupted by the operation of contacts 36, 38, 154, 156 of relay 40 and is locked out during the transmission of ringing signals to the station equipment until the subscriber equipment is connected into the circuit in response to audible ringing signals at that location.

The ring trip portion of the circuit includes trip relay winding 158, diode network 160, including diodes 162, 164, 166 and 168, and ringing signal bypass capacitors 170, 172, 174 and 176. This portion of the circuit is connected in series circuit relationship with the source of ringing signals and the subscriber loop to permit detection of loop currents having a very small amplitude even in the presence of simultaneous ringing signals. Upon detection of an off-hook condition by relay 158 and operation of trip relay contacts 178, 180 in response thereto, a ring trip signal is transmitted to the central office to interrupt the supply of ringing voltage to the dial long line unit from the central office. At the same time, current flow through winding 40 is interrupted restoring contacts 36, 38 to their normally closed position reestablishing the continuity of the voice frequency transmission path and opening the circuit leading to a local ringing source.

Depending upon specific loop conditions with respect to each subscriber loop with which the unit of the present invention is used, ringing signals may be provided from one of two sources for passing on to the subscriber loop. When the ringing signal is transmitted from the central office, the tip side 42 of the loop from the central office is connected by means of strap 182 between terminals 184 and 186. Similarly, the ring side 44 of the central office loop is connected by means of strap 188 between terminals 190 and 192. Where the ringing signal is to be transmitted from a local ringing generator connected to the unit 10 by means of terminals 194, 196, straps 182 and 188 are now interconnected between terminals 186, 198, and 192, 200 respectively. When utilizing a local ringing generator, operation of relay 40 is delayed in order to inhibit false ringing of the subscriber equipment by connecting strap 202 between terminals 203, 204. When transmitting ringing signals from the central office ringing generator, strap 202 is connected between terminals 203, 205.

A connector 96 provides the circuit connections whereby a subscriber loop booster battery module 34 can be connected to the dial long line unit 10 of the present invention. As indicated previously, the booster battery module 34 is connected to unit 10 and the subscriber loop to maintain the nominal current levels in the subscriber loop when the loop resistance is of a value on the order of 1,500 ohms or greater. In function, module 34 is a DC to DC converter utilizing the same power source (normally the central office battery supply) as the dial long line unit operating in response to the on-off action of multivibrator 56.

Figure 4:
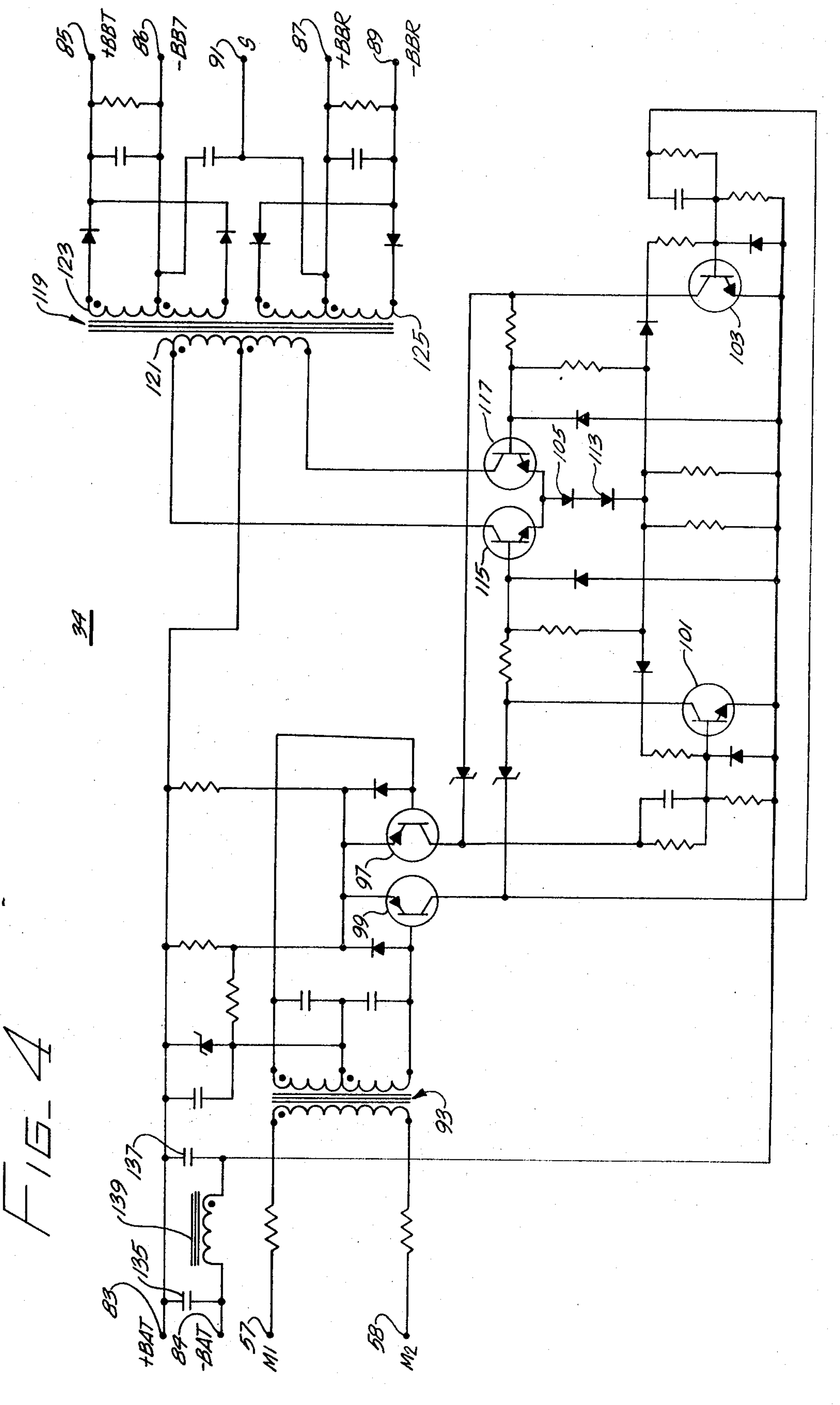
FIG. 4 is a schematic diagram of a booster battery unit for use with the subscriber loop extension unit.

The schematic diagram of FIG. 4 illustrates the various components utilized in the auxiliary booster battery circuit for providing a booster voltage across diodes 92, 94 in the dial long line unit to the tip and ring side of the subscriber loop. The paths of circuit interconnection between the booster module and the loop extension unit are indicated by common terminal markings on the connector 96 in FIG. 3 and the various terminals as indicated in FIG. 4. The connection of the central office battery to module 34 for energizing the module is by means of terminals 83, 84 labeled +Bat and −Bat. The connection of the output of the module to maintain nominal loop current to the tip and ring side of the loop is through terminals 85, 86, 87 and 89, ±BBT ±BBR, respectively.

The booster battery module is connected to multivibrator 56 via terminals 57, 58 and operates to maintain proper current levels in the subscriber loop responsive to on and off operations of the multivibrator. Terminals 57, 58 are connected through current limiting resistors 79, 81 and transformers 93 to a pair of switching transistors 95, 97 which in turn connect to and control the operation of a second pair of switching transistors 101, 103. Transistors 101, 103, together with diodes 105, 113, control the operation of a pair of power transistors 115, 117 and protect these slower acting power transistors by preventing conduction of one until the other has been positively turned off. Diodes 105, 113 limit current to transistors 115, 117, protecting the transistors against secondary breakdown and provide sufficient bias to maintain the transistors in the OFF condition. The low level output signal from the free running multivibrator 56 of the dial long line unit triggers transistors 95, 97 and succeeding transistors 101, 103 to produce alternate conduction of transistors 115, 117. The output of the power transistors in turn produces a high level signal on the primary winding 121 of transformer 119.

A correspondingly high level signal is produced in secondary windings 123, 125 and each of the output signals therefrom is rectified by diodes 127, 129, 131 and 133. Thereafter the two series aiding voltages output from the diodes are transmitted to the subscriber tip and ring via terminals 85, 86, 87, 89 and across diodes 92, 94 (the ±BBT and ±BBR connections) as indicated previously.

A filter comprising capacitors 135, 137 and inductor 139 is provided between terminals 83, 84 and the booster battery circuit similar to the power filter provided in the dial long line unit 10 to prevent the transmission of noise from the battery circuit into the voice frequency transmission portion of the subscriber loop.

In an alternate embodiment it is contemplated that coupling of multivibrator 56 to transistor 78 can also be accomplished by optical means utilizing a gallium arsenide diode or the like as a replacement for transformer 104 to control the ON-OFF operation of transistor 78. Similarly, optical coupling of the booster battery module to the subscriber loop extension unit to control operations of this module is also contemplated as part of such an alternate embodiment.

On long transmission facilities the unit of the present invention can also be combined with voice frequency repeaters. Such an arrangement results in a combination of the beneficial features of an AC amplifier for voice signals and the dial long line unit for extension of dial, ringing and supervision ranges without degradation of repeater return loss or reduction of available gain.

What is claimed is:

1. In a two wire transmission system having at least one dial pulse signalling path and an alternating current path in parallel circuit relationship with the signalling path, a direct current isolating circuit in the signalling path comprising:

means for generating a periodically varying signal;

means for controlling the operation of the signal generating means responsive to dial pulse signals in the system; and periodically varying signal coupling means for transmitting an output from the signal generating means into the signalling path and for providing direct current signal isolation along the signalling path.

2. A circuit according to claim 1 wherein the means for generating a periodically varying signal is a free running multivibrator.

3. A circuit according to claim 2 wherein the periodically varying signal coupling means is a transformer having a primary winding connected to the output of the multivibrator.

4. A circuit according to claim 3 including a central office pulsing transistor connected to a secondary winding of the transformer.

5. A circuit according to claim 4 wherein the controlling means is a sensing circuit for detecting the presence of direct current in the transmission system.

6. A unit for extending the range of a two wire transmission circuit having a tip side and a ring side comprising:

an alternating signal transmission circuit interconnecting a central switching location and station equipment located remotely with respect to the switching location;

a ringing signal path connected in parallel circuit relationship with the transmission circuit;

switch means connected to the alternating signal transmission circuit and said first signal path;

a source of ringing signals connected to the switching means;

circuit means connected to the source of signals and the switching means for controlling the operation of said switching means and disconnecting the signal source from the station equipment, said circuit means being responsive to an off-hook condition at the station equipment;

a direct current isolating signal path including a dial pulse repeater for transmitting pulsing signals from the station equipment to the central switching location connected in parallel circuit relationship with the transmission circuit and the ringing signal path and a source of electrical power connected to said direct current signal path and the switching means.

7. A unit according to claim 6 wherein the transmission circuit includes a balanced transformer having a primary winding connected to the central office tip and ring side of the circuit and a secondary winding connected to the subscriber tip and ring side of the circuit.

8. A unit according to claim 7 wherein the first signal path includes a detector circuit for sensing the presence of ringing signals transmitted from the central switching location.

9. A unit according to claim 8 wherein the switching means is a relay operable responsive to the detector circuit for selectively connecting the alternating signal transmission circuit or the source of signals to the station equipment.

10. A unit according to claim 9 wherein the source of signals is a ringing signal generator located in the central switching location.

11. A unit according to claim 9 wherein the source of signals is a local ringing signal generator associated with the unit.

12. A unit according to claim 9 wherein the circuit means is a ring trip relay operable responsive to connection of the station equipment to the transmission circuit.

13. A unit according to claim 12 wherein the second signal path includes a dial pulse repeater circuit for transmitting dial signaling pulses from the station equipment to the central switching location.

14. A unit according to claim 13 wherein the dial pulse repeater circuit includes a free running multivibrator and a transformer for providing DC isolation of the unit from the central office.

15. A unit according to claim 14 including an auxiliary power source connectible to the unit.

16. A unit for extending the range of an exchange telephone circuit comprising:

a voice frequency transmission circuit interconnecting a telephone central office and station equipment at a subscriber location;

a dial pulse repeater connected in parallel circuit relationship with the voice frequency transmission circuit; said dial pulse repeater comprising a subscriber switching circuit, a signal generator connected to the output of the subscriber switching circuit and a central office switching circuit connected to the output of the signal generator;

first switching means connected in the transmission circuit for controlling the transmission of ringing signals to said station equipment and for controlling the interruption of said voice frequency transmission circuit; and second switching means connected to the first switching means for controlling said first switching means, said second switching means being responsive to connection of the station equipment to the telephone circuit to disconnect the ringing signals from the station equipment and to control the completion of continuity of the voice frequency transmission circuit.

17. A unit according to claim 16 wherein the central office switching circuit includes a transformer connected to the output of the signal generator for providing DC isolation of the dial pulse repeater from the central office.

18. A unit according to claim 16 including a ringing signal detector connected in parallel circuit relationship with the voice frequency transmission circuit and the dial pulse repeater.

19. A unit according to claim 18 wherein the first switching means is a ring relay operable responsive to the ringing signal detector for selectively connecting the voice frequency transmission circuit or a source of ringing signals to the station equipment.

20. A unit according to claim 19 wherein the second switching means is a ring trip relay operable responsive to an off-hook signal from the station equipment for controlling the connection of ringing signals to the station equipment through the ring relay.

21. A unit according to claim 20 including an auxiliary power source connected to the subscriber switching circuit and the signal generator operable responsive to operations of the signal generation for supplying current to that portion of the circuit between the unit and the station equipment.

* * * * *